Oct. 20, 1936.    M. W. HARD ET AL    2,057,824
BRAKE
Filed Dec. 29, 1931    2 Sheets-Sheet 1
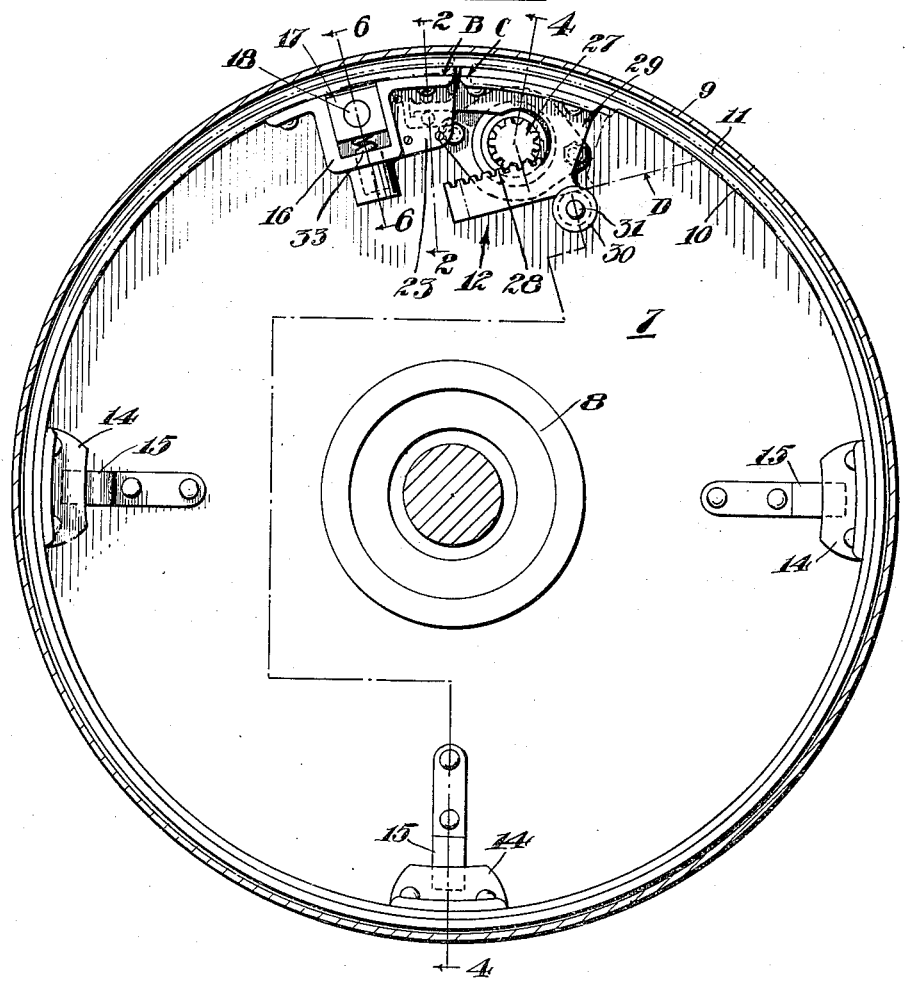
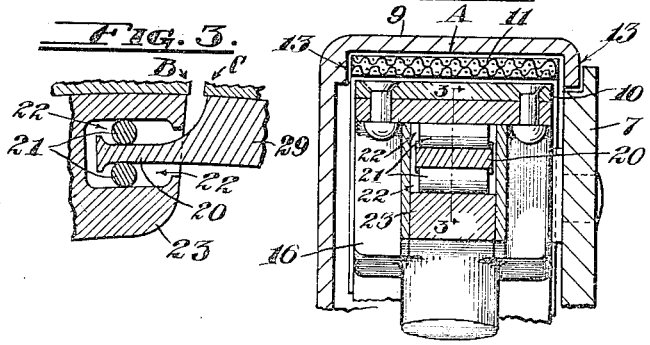
Inventors:
Merrill W. Hard,
Charles Peterson,
By
Attorney Oct. 20, 1936.  M. W. HARD ET AL  2,057,824
BRAKE
Filed Dec. 29, 1931  2 Sheets-Sheet 2
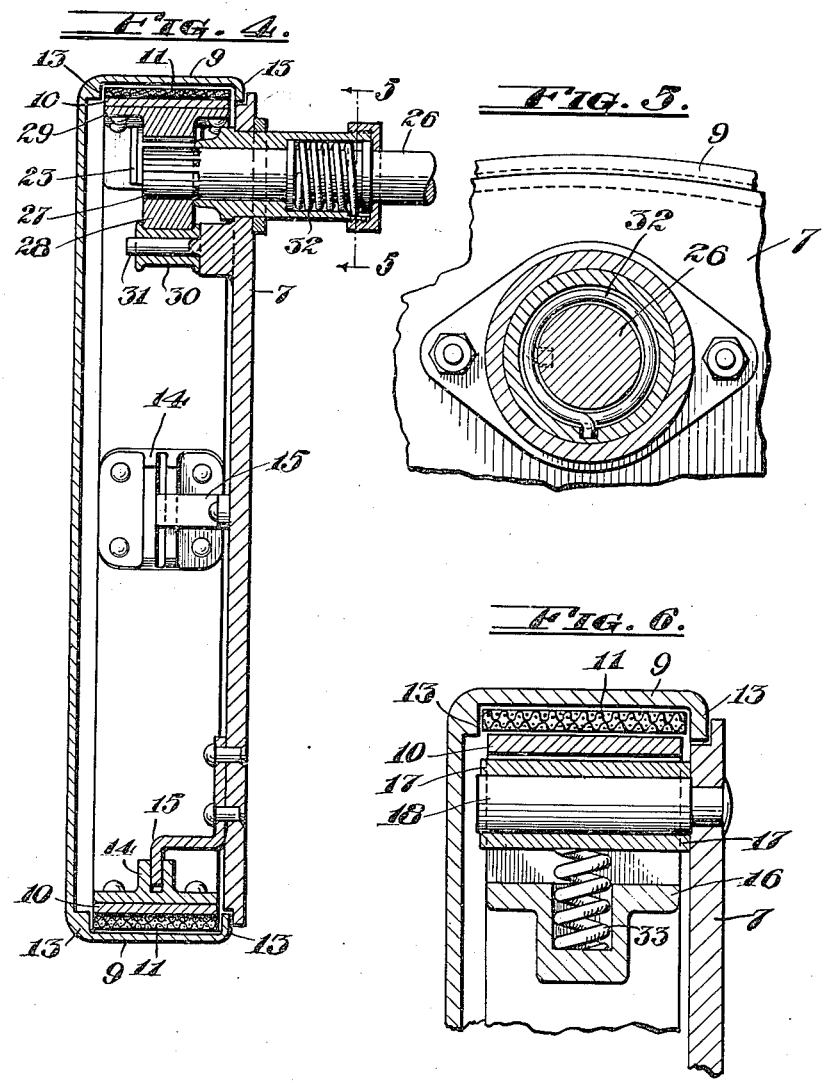
Inventors:
Merrill W. Hard,
Charles Peterson.
By
ATTORNEY.

Patented Oct. 20, 1936

2,057,824

UNITED STATES PATENT OFFICE 2,057,824

BRAKE

Merrill W. Hard, Glendale, and Charles Peterson, Pasadena, Calif., assignors to Tyle Tye, Incorporated, Ltd., a corporation of California Application December 29, 1931, Serial No. 583,624

13 Claims. (Cl. 188—78)

The present invention relates to vehicle brake mechanism of the type forming the subject matter of our pending application, Serial Number 547,008; filed June 26, 1931; it being a purpose of this invention to provide the advantages and objects of said former invention with greater efficiency through the use of an improved mechanism which also affords advantages not heretofore contemplated.

Primarily this invention resides in the provision of a comparatively simple and inexpensive brake mechanism of strong and durable construction wherein the braking elements will be uniformly and simultaneously engaged throughout the circumference thereof in such manner as to insure a smooth positive braking action free from grabbing, chattering, noise, and uneven and undue wear and distortion of the braking elements.

One of the objects of the invention is to provide a brake mechanism wherein an expansible brake band is mounted and maintained in such operative relation to a brake drum and so moved into braking position that the coefficient of friction is simultaneously and uniformly determined throughout the entire circumferences of the braking elements in a particularly efficacious manner.

Another object of the invention is to provide a brake wherein a continuous, full floating brake lining is employed in such advantageous manner as to utilize the inner and outer surfaces of the lining as braking areas, and also eliminate rivet and the wear, scoring and uneven braking actions such as often caused by linings which are riveted to the brake band.

A further object of the invention is to provide a brake having a pronounced and highly advantageous self actuating factor which is under the direct control of the operator at all times.

Yet another object is to provide a brake of the character described wherein the self actuation thereof is effective throughout the entire circumference of the brake band in a particularly efficacious manner.

Still another object is to provide a brake wherein the self actuation thereof is initiated at one end of the brake band and controlled in such manner as to be effective uniformly and simultaneously throughout the entire band, and is also under manual control as to the intensity of its effective action.

Another object is to provide a brake of the character described wherein the ends of a split circular expansible brake band forming a part of the brake are joined in such manner as to insure a simultaneous and equal movement of said ends towards and away from the brake drum whereby all likelihood of one end contacting the drum before the other is positively prevented.

With the foregoing objects in view, together with such other objects and advantages as may subsequently appear, the invention resides in the parts and in the combination, construction and arrangement of parts hereinafter described and claimed and illustrated by way of example in the accompanying drawings, in which:

Figure 1 represents a sectional view of brake mechanism constructed in accordance with this invention;

Figure 2 is an enlarged sectional view taken on line 2—2 of Figure 1;

Figure 3 is a sectional view taken on line 3—3 of Figure 2;

Figure 4 is a sectional view taken on line 4—4 of Figure 1;

Figure 5 is an enlarged sectional view taken on line 5—5 of Figure 4;

Figure 6 is an enlarged section taken on line 6—6 of Figure 1.

The present embodiment of the vehicle brake of this invention generally comprises a stationary plate like support 7 carried on the axle housing 8, a wheel carried rotary brake drum 9, an open or split expansible band 10, a full floating continuous brake lining band 11 between the drum and band, and an actuating means 12 arranged to evenly expand the ring in such manner that it will simultaneously engage the drum through the lining band, at all points of its circumference and under a uniform pressure.

The drum 9, it will be noted, is characterized by annular flanges or guides 13 which retain the free lining band 11 in proper opposition to the braking surface A of said drum.

The expansible brake band 10 is constructed so as to be highly resilient whereby owing to the manner of its mounting and the manipulation thereof, it will readily contact and effect a quick release of the brake mechanism without depending entirely upon the use of springs in the brake proper.

At the end portion B thereof the band 10 is fixed to the side plate 7 in such manner that it is permitted radial movement only, towards and away from the drum, whereas the other end C of the band is limited to movement towards and away from the drum on a straight path of travel extending at an angle relative to the plane of the radius constituting the path of travel of the end portion B. The edges of the ends B and C of the band are disposed in close juxtaposition to each other so as to afford a minimum of gap therebetween when the band is expanded. In the arrangement here shown, the ends B and C of the band are disposed at the upper portion thereof, assuming the brake drum and band as being disposed vertically, and with the ends of the band terminating contiguous the plane of the vertical radius of the drum and band. Movement of the end C is accomplished by the action of the actuating means 12 which also effects the aforesaid movement of the end B. Furthermore, the band 10 is maintained against lateral displacement from position of proper opposition to the lining 11 and drum 9 by guide means which as here shown consists of slotted blocks 14 riveted to the band at equidistantly spaced points and slidably receiving guide brackets 15 which are fastened to the side plate 7.

As here shown, the means for securing the end B of expansible band 10 comprises a yoke 16 riveted to the band and slide block 17 supported on a pin 18 fixed to the side plate 7, which yoke is guided on the block 17 to cause the end portion B to travel in the direction of the plane of a radius of the drum and band extending axially through the pin 18 and which radius is herein referred to as the path of travel of the end portion B. It is noted that the block 17 is permitted a slight rotary movement on the pin 18 whereby it will readily accommodate itself to any irregular movements of the yoke 16 which might occur during movement of the band towards and away from the drum. Owing to this arrangement the block 17 will slide freely without binding or creating undue wear of the parts of the connection.

In order that the actuating means 12 operates to move the end B of the band 10 radially outward toward the brake drum 9, simultaneously with the movement of the end C, the latter is connected with end B. One way of effecting this connection is to provide, as here shown, a rigid extension 20 at the end C arranged to slidably engage between rollers 21 riding freely in a recess 22 formed in a block 23 fixed on the end B. It will now be apparent that any movement of the end C towards and away from the drum will be accompanied by a similar movement of the end B, whereby the entire brake band is caused to be uniformly applied throughout its circumference with the result of a more positive braking action accompanied, however, by a pronounced smoothness of action which is free from "grabbing", uneven wear and appreciable noise.

The means 12 for actuating the brake band 10 comprises an arrangement which will move the end C of the band in a definite straight path which in the arrangement shown in Fig. 1 will be on the plane of a cord of the circle represented by the inner circumference of the drum, which plane extends from the margin of the end C toward the inner periphery of the drum away from the end B at an angle relative to the radial path of travel of the end B and which plane extends parallel with the line D, indicated in Fig. 1, extending perpendicular to the radial path of travel of the end portion B.

It has been found that in transmitting a thrust to the end C in a path paralleling line D the entire band 10 is moved simultaneously under substantially uniform pressure into contact with, and likewise moves the lining, into uniform contact with the drum. The effect is the same whether the lining is fixed to or floats around the band as far as the simultaneous engagement of all parts of the "band" with the drum is concerned, although it should be noted that the floating continuous lining provides double the braking surface of a lining fixed to the band and therefore increases the efficiency of the present invention.

As here shown, the actuating means 12 includes a rotary shaft 26 extending through the plate 7 and arranged to be rotated by the usual automobile brake rigging, not shown. A pinion 27 is provided on the shaft 26 and is adapted to mesh with a rack bar 28 which is part of a plate 29 fixed to the end C of the brake band 10, it being here noted that the extension 20 which connects end C with end B is also a part of said plate. Bearing against the lower edge of the rack bar 28 is an abutment roller 30 mounted on a pin 31 fixed to the plate 7, said roller acting to maintain the rack bar against the pinion 27 and acting as a guide and stop as will be hereinafter more fully explained. It is noted that a spring 32 on the shaft 26 is arranged to aid in releasing the band 10 and that this movement is also aided by a spring 33 between the block and yoke.

The disposition of rack bar 28 and roller 30 relative to the radial path of travel of the end portion B is of utmost importance as these elements define the predetermined movement of the end C as well as of the entire band 10. As here shown the rack bar has its longitudinal axis inclined upwardly at an acute angle relative to the vertical axis of the band and drum which angle is perpendicular to the radial path of travel of the end portion B. The angle or inclination of the rack bar defines the path of movement of end C and is therefore parallel to the line D.

The roller 30 is preferably positioned to one side of a vertical line passing through the center of the pinion 27 whereby when the brake is applied and the rack bar 28 has been extended outward and upwardly from the position shown in full lines in Figure 1 to the dotted position in said figure, the roller will be in position to prevent any rocking or other movement of the rack bar that would tend to disengage it from the pinion 27 or effect improper meshing of the rack bar with said pinion. This is essential inasmuch as it is apparent that when the force of the rotating brake drum is applied to the brake band in the direction of rotation of the drum, the band tends to surge or move with the drum. The rack bar 12 will also tend to move and even though the circumferential movement of the band is prevented by the manner of securing it in place, the inherent resiliency of the brake assembly is such that through the yield or give of this assembly the rack bar tends to move bodily to some extent. If the roller were placed near to the free end of the rack bar it is seen that the aforesaid "surge" would cause a slight arcuate and downward movement of the rack bar somewhat in the path of the curve of band and drum and thereby cause an improper meshing of the rack with the pinion as well as cause a differential in movement of the ends B and C and to a measure defeat the advantage of simultaneous engagement of the entire band with the drum.

With the roller 30 positioned near the inner end of the rack bar somewhat as here shown in Figure 1 all objectionable movement of the rack as aforesaid is prevented due to the stop action of the roller and to a force created thereby. This force aids in keeping the rack and pinion in proper mesh as well as in insuring a simultaneous presentation of the entire band into braking position and is due to the wedge action which occurs as the inclined lower face of the rack moves outward upon the fixed roller 30. The force of this wedge action tends to thrust the rack outward and upward from the roller 30 whereby the end C of band 10 will positively follow the path indicated by the line D.

It is important to emphasize the employment of the full floating continuous brake lining and the use of a brake band which is fastened at one end so as to be limited to radial movement towards and away from the brake drum while the other end is moved in a straight path as before described. Owing to this manner of mounting the band, the arcuate coefficient of friction is effective uniformly throughout the circumference of the band and therefore a smooth even, powerful braking action is provided for without undue or uneven wear on the parts or distortion of the drum.

The efficacy of the braking action, as will now be noted, is augmented by the use of the continuous full floating lining.

It will now be apparent that the brake band 10 is expanded and contracted in such manner that the movement thereof towards and away from the drum is controlled and timed to cause the entire circumference of the band to be simultaneously engaged with the brake drum. In the operation of the band, it is seen that the ends of the band must be separated to lengthen or to increase the diameter of the band sufficient to cause engagement of the periphery thereof with the drum. Unless this expansion movement is definitely controlled one part of the band will engage the drum before the remaining part, as is usually the case with internal expanding brakes such as heretofore constructed. Therefore, in order to cause the band to simultaneously engage the drum throughout its circumference, it is necessary to cause the band to move outwardly towards the drum at the same rate of movement throughout the band.

In the present embodiment of the invention, by having the band secured against circumferential movement at one end while permitting said end to move radially towards and away from the drum, and slidably connecting the two ends of the band whereby movement of one end towards the drum causes like movement of the other end, and then moving the second named end in a predetermined straight line which is angularly related to the path of movement of the first named end, the band will be expanded and contracted so as to cause the entire circumference thereof to be simultaneously engaged with and disengaged from the drum.

The angle of thrust or movement of said end of the band is determined by the amount of clearance of the band from the drum when the brake is released, inasmuch as the rate of movement of the said ends of the band towards the drum must be accompanied by an expansion of such band as necessary to cause the full circumference thereof to be moved simultaneously at the same rate of movement towards the drum. I have found that by transmitting to one end of the band an expanding thrust in a straight line that is parallel to a tangent extending perpendicular to the radial path of travel of the other end of the band, and causing said end to move outwardly in a straight line corresponding to said tangential line of thrust, that the simultaneous engagement of the entire band with the drum, and the other advantages of the invention are obtained in a particularly efficacious manner.

In accordance with the present embodiment of the invention the rack bar which transmits the operating thrust to the end C of the brake band, causes said end to move in a straight line which is parallel to the line of travel of said rack bar and substantially perpendicular to the radial line of movement of the end B of the band.

It may therefore be asserted that the desired operation and control of the movement of the band in accordance with this invention, may be effected by transmitting substantially right angular thrusts to the ends of the band in such manner that the entire circumference of the band is simultaneously engaged with the drum.

It is of utmost importance to note that the brake of this invention is characterized by a self actuation factor which is under direct control of the operator at all times. This self actuation is effective uniformly and practically simultaneously throughout the entire circumference of the brake band. By reason of the aforesaid direct control of the self actuation factor of the brake, grabbing or locking and other objectionable actions of the brake are prevented and the efficiency of the brake is appreciably increased.

By way of pointing out the manner in which controlled self actuation is manifested, it is seen that inasmuch as one end of the brake band, the end B, is fastened so as to be limited to radial movement towards and away from the drum, while the end C of the band is limited to outward and upward movement in a straight line which is substantially perpendicular to the movement of end B, the force of the rotating brake drum which becomes effective through the frictional contact of the latter with the brake band, acts to expand the band and increase the pressural engagement thereof with said drum. This action, it will be noted, is effective uninterruptedly throughout the band from the end C to the end B, and substantially uniformly and simultaneously. However, it will be noted that the self actuation is initiated at the end C due primarily to the fact that as the brake drum rotates in a direction away from the "fixed" end B, the rotative or self actuating force of the drum is thereby first effective against end C, and said end is caused to move in the predetermined straight line upward and outward rather than arcuately. Owing to the limited movement permitted the end C and the location of the rack bar at said end, it is seen that a greater pressure of the band against the drum is brought about in the vicinity of said end and that this greater pressure insures the initiation of the self actuation at said end, whereupon the controlled and predetermined movement permitted the band causes the self actuation thus set up to then be uniformly and simultaneously applied uninterruptedly throughout the band.

Although the self actuation force tends to move the band arcuately, such action is prevented by the controlled straight line movement of end C and the radial movement of end B. In checking arcuate movement of the brake band, the self actuating force is caused to be transmitted to the band in the same manner as though the rack bar were extended when manually operating the brake. Therefore, the self actuation is in effect an automatic extension or continuation of the ordinary or initial manual actuation of the brake, but is at all times under control of the operator. This control is due to the fact that the pressure on the end C, the starting point of self actuation, is released immediately the brake is manually released and that the band as a whole is simultaneously disengaged from the drum by the contractive force, the band and springs being greater than the self actuating force, when the manual actuating effort is removed from the brake. In this way or in other words owing to the fact that the entire friction surface of the band is simultaneously removable from contact with the drum at will, self actuation is preventable at the will of the operator and can under no circumstances continue when and after removal of foot pressure from the brake pedal is brought about. It is now apparent that a safe and highly advantageous self actuation factor is provided for with the brake of this invention due to the fact that the self actuating force is applicable and removable at will and at all times under control as to the degree or intensity of its effective action.

We claim:

1. In a brake, a stationary member, a rotary brake drum, a split brake band arranged interiorly of said drum, means of connection between one end of said band and said stationary member limiting said end to movement radially towards and away from said drum, actuating means connected with said stationary member and operable to move the other end of said band towards said drum on a straight path perpendicular to the radial movement of the opposed end of said band, and means of connection between said ends of the band operating to cause simultaneous movement of said ends towards the drum upon operation of said actuating means.

2. In a brake, a stationary member, a rotary brake drum, a split brake band arranged interiorly of said drum, means of connection between one end of said band and said stationary member limiting said end to movement radially towards and away from said drum, actuating means connected with said stationary member and operable to move the other end of said band on a straight path towards said drum, means of connection between said ends of the band operating to cause simultaneous movement of said ends towards the drum upon operation of said actuating means, said last named means comprising a recessed member carried by the first named end, an extension carried by the other end and extended into the recess of said member, and anti-friction members slidable in said recess and engaging upon opposite sides of said extension.

3. In a brake, a stationary member, a rotary brake drum, an expansible split brake band interiorly of said drum having its ends normally disposed in close juxtaposition, means of connection between one end of said band and said member, band expanding means connecting the other end of said band with said member, and means of sliding connection between the ends of said band operating to effect simultaneous movement of said ends towards said drum on paths extending perpendicular to each other.

4. In a brake, a stationary member, a rotary drum, a split circular brake band within said drum, means carried by said member and affixed to one end of said band for limiting said end to radial movement towards and away from said band, a continuous band of brake lining material loosely interposed between and being free from connection with said drum and band, band expanding means carried by said member and operating to limit the movement of the other end of said band to a path which extends on the plane of a chord of the drum and band, and means of connection between the ends of the band operating to effect a simultaneous movement of said ends towards said drum.

5. In a brake, a stationary member, a rotary brake drum, an expansible split circular brake band within said drum, means of connection between one end of said band and said member, a rack bar fixed to the other end of said band, means of sliding connection between the ends of said bands preventing relative outward movement of said ends towards the drum, a shaft carried by said member, a pinion on said shaft meshing with said rack bar, and an abutment on the stationary member arranged to engage and hold the rack bar against said pinion, said rack bar having its longitudinal axis arranged to parallel a line which is tangential to the drum at the connected end of said band.

6. In a brake, a rotary brake drum, a split circular brake band interiorly of said drum, and actuating means operable at the ends of said band to move said ends in rectilinear right angular paths towards and away from said drum.

7. In a brake, a rotary brake drum, a split circular brake band interiorly of said drum, actuating means operable at the ends of said band to move said ends in substantially right angular paths towards and away from said drum, and means of sliding connection between said ends of the bands operating to cause simultaneous and corresponding movement thereof towards and away from said drum.

8. In a brake, a rotary brake drum, a split circular brake band interiorly of said drum, and actuating means operable through the ends of said band to move said ends simultaneously towards said drum, with one end moving in a path perpendicular to the path of the other end.

9. In a brake, a stationary support, a rotary brake drum, a split circular brake band interiorly of said drum, means of connection of one end of said band with said support operating to permit radial movement of said end towards said drum and preventing circumferential movement of said band, means for thrusting the other end of said band outwardly in a path substantially perpendicular to the path of movement of the first named end of the band, and means of sliding connection between said ends operating to effect movement of the first named end towards the drum simultaneously with a like movement of the other end of the band.

10. In a brake, a stationary support, a rotary brake drum, a split circular brake band interiorly of the drum, means connecting one end of said band with said support and operating to permit radial movement of said end towards and away from said drum while holding the band against circumferential movement, means of sliding connection between the ends of said band operating to effect a simultaneous movement of said ends, a rack bar fixed to the other end of said band and having its longitudinal axis disposed substantially perpendicular to the path of movement of the first named end of said band, actuating means including a pinion for operating said rack bar, and an abutment member on said support operating to maintain said rack bar in operative engagement with said pinion.

11. In a brake, a stationary support, a rotary brake drum, a split circular brake band interiorly of the drum, means connecting one end of said band with said support and operating to permit radial movement of said end towards and away from said drum while holding the band against circumferential movement, means of sliding connection between the ends of said band operating to effect a simultaneous movement of said ends, a rack bar fixed to the other end of said band and having its longitudinal axis disposed substantially perpendicular to the path of movement of the first named end of said band, actuating means including a pinion for operating said rack bar, and an abutment member on said support operating to maintain said rack bar in operative engagement with said pinion, said abutment member engaging said rack bar at a point to one side of a line which passes perpendicularly of the rack and pinion.

12. In a brake, a stationary support, a rotary brake drum, a split circular brake band interiorly of the drum, means connecting one end of said band with said support and operating to permit radial movement of said end towards and away from said drum while holding the band against circumferential movement, means of sliding connection between the ends of said band operating to effect a simultaneous movement of said ends, a rack bar fixed to the other end of said band and having its longitudinal axis disposed substantially perpendicular to the path of movement of the first named end of said band, actuating means including a pinion for operating said rack bar, and a roller fixed to said support and engaging and holding said rack bar in operative engagement with said pinion, said roller, pinion and rack bar being so related as to create a wedging action tending to force the rack towards the pinion as the rack is extended.

13. In a brake mechanism, a brake drum, an internal flexible brake band in the form of a resilient split ring arranged interiorly of said drum, said band having the margins of the split thereof normally disposed in close juxtaposition relative to each other, a stationary member, a connection between one end portion of said band and said stationary member limiting said end portion to movement radially towards and away from said drum, and actuating means carried by said stationary member for moving the other end portion of said band in a direction toward and away from said drum on a straight path extending at an angle to the radius of movement of the opposed end portion.

MERRILL W. HARD.
CHARLES PETERSON.